(12) United States Patent
Bilik et al.

(10) Patent No.: US 10,509,120 B2
(45) Date of Patent: Dec. 17, 2019

(54) LIDAR-RADAR RELATIVE POSE CALIBRATION

(71) Applicant: GM GLOBAL TECHNOLOGY OPERATIONS LLC, Detroit, MI (US)

(72) Inventors: Igal Bilik, Rehovot (IL); Michael Slutsky, Kfar Saba (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 423 days.

(21) Appl. No.: 15/434,492

(22) Filed: Feb. 16, 2017

(65) Prior Publication Data

US 2018/0231654 A1  Aug. 16, 2018

(51) Int. Cl.
| | |
|---|---|
| *G01S 13/86* | (2006.01) |
| *G01S 7/40* | (2006.01) |
| *G01S 7/497* | (2006.01) |
| *G01S 13/93* | (2006.01) |
| *G01S 17/02* | (2006.01) |
| *G01S 17/93* | (2006.01) |
| *H01Q 15/18* | (2006.01) |
| *G01S 17/66* | (2006.01) |

(Continued)

(52) U.S. Cl.
CPC .......... *G01S 13/865* (2013.01); *G01S 7/4004* (2013.01); *G01S 7/4026* (2013.01); *G01S 7/497* (2013.01); *G01S 13/931* (2013.01); *G01S 17/023* (2013.01); *G01S 17/936* (2013.01); *G01S 17/66* (2013.01); *G01S 17/89* (2013.01); *G01S 2007/4086* (2013.01); *G01S 2013/9375* (2013.01); *H01Q 1/3233* (2013.01); *H01Q 15/18* (2013.01)

(58) Field of Classification Search
CPC ............. G06T 2207/10028; G06T 7/80; G01S 17/936; G01S 17/023; G01S 7/497; G01S 17/89; G01S 17/58; G01S 17/87; G01S 17/66; G01S 7/4972; G01S 13/931; G01S 13/865; G01S 17/003; G01S 2013/9375; G01S 7/40; G01S 7/52004; G01S 15/931; G01S 7/4808; G01S 17/026; G01S 13/86

See application file for complete search history.

(56) References Cited

U.S. PATENT DOCUMENTS

| | | | |
|---|---|---|---|
| 9,147,249 B2 * | 9/2015 | Kim .......................... | G06T 7/80 |
| 2014/0233023 A1 * | 8/2014 | Soininen ............... | G01S 17/936 |
| | | | 356/138 |

(Continued)

*Primary Examiner* — Olumide Ajibade Akonai
(74) *Attorney, Agent, or Firm* — Cantor Colburn LLP

(57) ABSTRACT

A method and apparatus for calibrating a LiDAR system at a first location with a radar system at a second location. A calibration target is placed at a location and orientation with respect to the LiDAR system and the radar system. Coefficients of a plane of the calibration target are determined in a frame of reference of the LiDAR system. Coordinates of the calibration target are determined in a frame of reference of the radar system. A cost function is composed from a planar equation that includes the determined coefficients and the determined coordinates and a relative pose matrix that transforms the frame of reference of the radar system to the frame of reference of the LiDAR system. The cost function is reduced to estimate the relative pose matrix for calibration of the LiDAR system with the radar system.

18 Claims, 3 Drawing Sheets

(51) Int. Cl.
  *G01S 17/89* (2006.01)
  *H01Q 1/32* (2006.01)

(56) References Cited

U.S. PATENT DOCUMENTS

2017/0169627 A1* 6/2017 Kim .................... G07C 5/0808
2017/0200273 A1* 7/2017 Kamilov ............ H04N 5/23232
2018/0196127 A1* 7/2018 Harada ................ G01S 7/4972

* cited by examiner

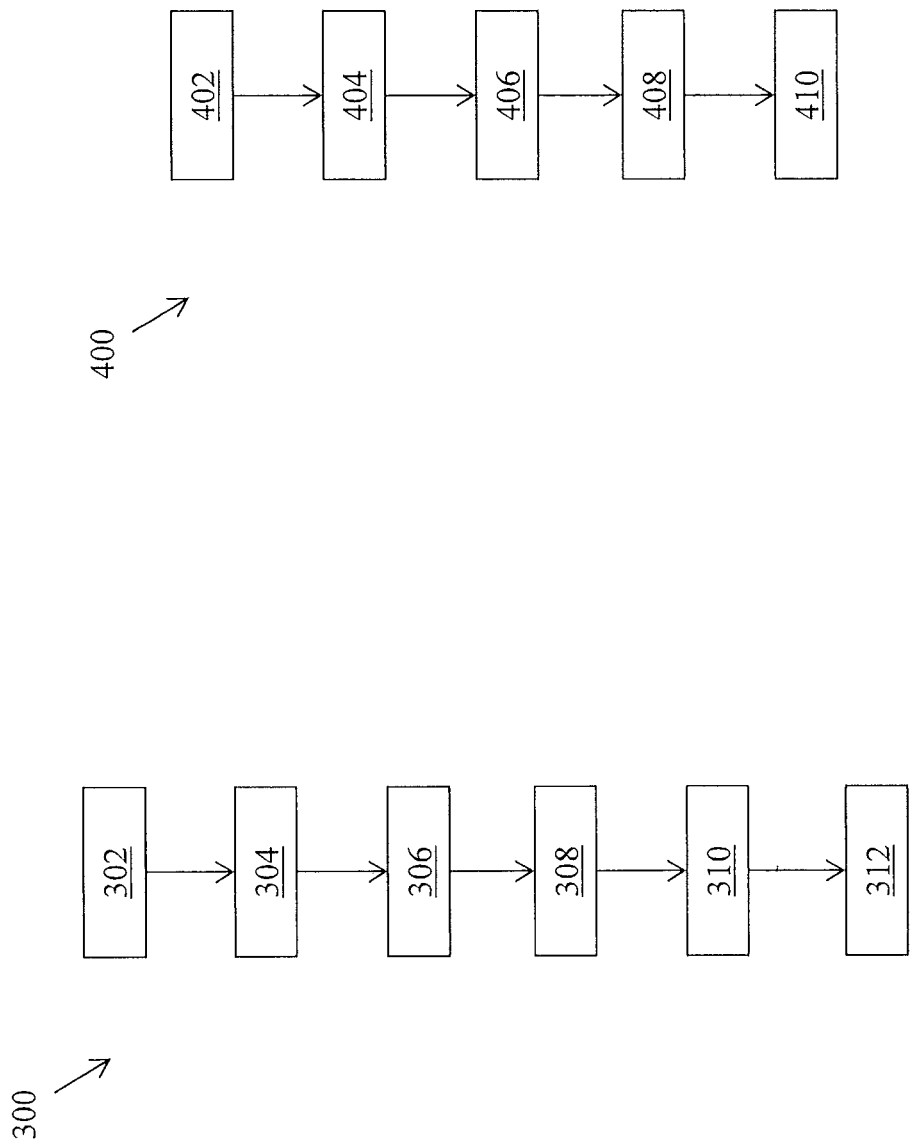

LIDAR-RADAR RELATIVE POSE CALIBRATION

INTRODUCTION

The subject disclosure relates to methods of calibrating measurements obtained using a LiDAR system with measurements obtained using a radar system. In particular, the disclosure provides a method and apparatus for calibrating measurements of an object obtained from a LiDAR system at a first location with measurements of the object obtained from a radar system at a second location.

Automotive vehicles can employ radar systems and/or light detection and range (LIDAR) systems in order to track objects in the environment of the vehicle. LIDAR generally excels in imaging surfaces of objects but is generally unreliable in providing dynamic information on the object such as its relative velocity. Radar, on the other hand, generally excels in providing range and velocity information of the object, but is poor at resolving an image of the object. It is desirable therefore to use both LiDAR and radar systems in cooperation with each other to provide as much information as possible on an object. However, when using both a radar system and a LiDAR system, there is necessarily a separation distance between the systems, which naturally produces measurement differences. Accordingly, it is desirable to calibrate the LiDAR system and radar system to remove the measurement difference so that the radar system and LiDAR system can be used cooperatively to track objects.

SUMMARY

In an exemplary embodiment, a method of calibrating a LiDAR system at a first location with a radar system at a second location is disclosed. The method includes providing a calibration target at a location and orientation with respect to the LiDAR system and the radar system. Coefficients of a plane of the calibration target are determined in a frame of reference of the LiDAR system. Coordinates of the calibration target are determined in a frame of reference of the radar system. A cost function is composed from a planar equation that includes the determined coefficients of the plane of the calibration target in the frame of reference frame of the LiDAR system, the determined coordinates of the calibration target in the frame of reference of the radar system and a relative pose matrix that transforms the frame of reference of the radar system to the frame of reference of the LiDAR system. The cost function is reduced to estimate the relative pose matrix for calibration of the LiDAR system with the radar system.

The calibration target includes a planar reflective area and a plurality of corner reflectors. The plurality of corner reflectors may include three or more corner reflectors. A LiDAR reflection signal is received from the planar reflective area of the calibration target and the coefficients of the plane of the calibration target are determined in the frame of reference of the LiDAR system from the LiDAR reflection signal. A radar reflection signal is received from the plurality of corner reflectors and the coordinates of the calibration target are determined in the frame of reference of the radar system from the radar reflection signals.

In an embodiment, the calibration target is provided at a plurality of locations and orientations. The coefficients of the plane of the calibration target are determined in the frame of reference of the LiDAR system for each of the plurality of locations and orientations. Coordinates of the plane of the calibration target are determined in the frame of reference of the radar system for each of the plurality of locations and orientations. A summed cost function is composed that includes a summation of cost functions for each of the plurality of locations and rotations, wherein each cost function includes the determined coefficients, the determined coordinates and the relative pose matrix for the related location and orientation of the target reflector. The summed cost function is reduced to estimate the parameters of the relative pose matrix.

In an embodiment, the relative pose matrix includes a rotation matrix and a translation matrix. For the LiDAR system and the radar system disposed on a vehicle, the LiDAR system, radar system and estimated relative pose matrix is used to track an object with respect to the vehicle. The vehicle is maneuvered based on parameters of the tracked object obtained using the LiDAR system, radar system and estimated relative pose matrix.

In another exemplary embodiment, an apparatus for calibrating a LiDAR system at a first location with a radar system at a second location is disclosed. The apparatus includes a calibration target at a location and orientation with respect to the LiDAR system and the radar system. A processor determines coefficients of the calibration target in a frame of reference of the LiDAR system, determines coordinates of the calibration target in a frame of reference of the radar system, composes a cost function from a planar equation that includes the determined coefficients of the calibration target in the frame of reference frame of the LiDAR coordinate system, the determined coordinates of the calibration target in the frame of reference of the radar system and a relative pose matrix that transforms the frame of reference of the radar system to the frame of reference of the LiDAR system, and reduces the cost function to estimate the relative pose matrix for calibration of the LiDAR system with the radar system.

The calibration target includes a planar reflective area and a plurality of corner reflectors. In one embodiment, the plurality of corner reflectors further includes three or more corner reflectors. The processor determines the coefficients of the plane of the calibration target in the frame of reference of the LiDAR system from a LiDAR reflection signal received from the planar reflective area of the calibration target and determines the coordinates of the plane of the calibration target in the frame of reference of the radar system from radar reflection signals received from the corner reflectors.

In an embodiment, the calibration target is placed at a plurality of locations and rotational angles and the processor: determines the coefficients of the plane of the calibration target in the frame of reference of the LiDAR system for each of the plurality of locations and orientations; determines coordinates of the plane of the calibration target in the frame of reference of the radar system for each of the plurality of locations and orientations; composes a summed cost function to include a summation of cost functions for each of the plurality of locations and orientations, wherein each cost function includes the determined coefficients, the determined coordinates and the relative pose matrix for the related location and orientation of the target reflector; and reduces the summed cost function to estimate the parameters of the relative pose matrix.

The relative pose matrix includes a rotation matrix and a translation matrix. In one embodiment, the LiDAR system and the radar system are disposed on a vehicle and the processor is further configured to track an object with respect to the vehicle using the LiDAR system, radar system and estimated relative pose matrix. The processor also maneuvers the vehicle based on parameters of the tracked object obtained using the LiDAR system, radar system and estimated relative pose matrix.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 shows a flowchart illustrating a method for determining a relative pose matrix between a LiDAR system and a radar system as disclosed herein; and FIG. 4 shows a flowchart that illustrates another method for determining the relative pose matrix using a plurality of positions and orientations of the calibration target.

DETAILED DESCRIPTION

The following description is merely exemplary in nature and is not intended to limit the present disclosure, its application or uses.

Figure 1:
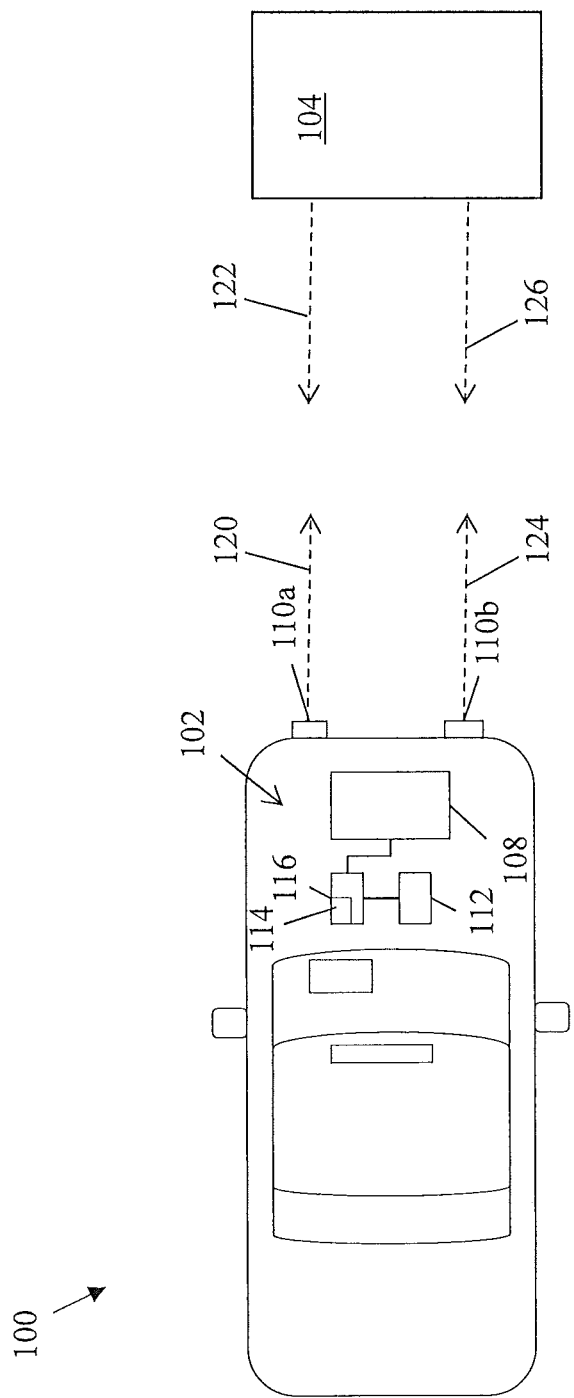
FIG. 1 shows a vehicle having both a LiDAR system and a radar system for obtaining measurements with respect to an object in the environment of the vehicle, in an embodiment.

In accordance with an exemplary embodiment of the disclosure, FIG. 1 shows a vehicle 100 having both a LiDAR system and radar system for obtaining measurements with respect to an object in the environment of the vehicle in order to provide enhanced driving capabilities to the vehicle. The vehicle 100 operates an autonomous driving system 102 that includes a radar control system 108, a control unit 116 and a collision-avoidance system 112. The radar system 108 operates multiple sensors or transducers that are disposed at various locations of the vehicle 100, including radar transducer 110a and LiDAR (light radar) transducer 110b.

The radar transducer 110a transmits a radio frequency source signal 120 into a volume in front of the vehicle 100. Object 104 reflects the radio frequency source signal 120 in the form of a reflected radio frequency signal 122 which is received at the radar transducer 110a. The object 104 can be a stationary object or a moving object; can be a pedestrian, light post, another vehicle, building, etc. Differences between the radio frequency source signal 120 and the reflected radio frequency signal 122 are used to determine various properties of the object 104 such as its range and velocity with respect to the vehicle 100. The LiDAR transducer 110b transmits a light source signal 124 into the volume in front of the vehicle 100. The object 104 reflects the light source signal 124 in the form of a reflected light signal 126 which is received at the LiDAR transducer 110b. The differences between the light source signal 124 and reflected light signal 126 are used to determine various parameters with respect to the object 104. In various embodiments, the LiDAR transducer 110b can be used to provide an image of the object 104. While the radar transducer 110a and LiDAR transducer 110b are shown only at a front end of vehicle 100, similar system can be installed on a back end of vehicle 100, side of vehicle 100, etc.

The radar control system 108 provides radar measurement data (i.e., radio frequency source signal 120 and reflected radio frequency signal 122 data) and LiDAR measurement data (i.e., LiDAR light source signal 124 and reflected light signal 126 data) to control unit 116. The control unit 116 may include one or more processors 114. The one or more processors 114 determine various parameters of the object 104 from the radar measurement data and the LiDAR measurement data that can be used at the collision-avoidance system 112.

The collision-avoidance system 112 obtains inputs (e.g., speed, braking rate, acceleration) of the vehicle 110 from known internal components and other sensors of the vehicle 100 and uses this information along with the various parameters of the object 104 from the control unit 116 in order to determine a path that avoids contact with the object 104. The collision-avoidance system 112 then maneuvers the vehicle 100 along the path, thereby providing the ability of the vehicle 100 to drive safely through its environment. Additionally or alternatively, the collision-avoidance system 112 may provide an alert to a driver of the vehicle 100 when hazardous driving conditions are imminent.

Due to differences in the locations of the transducers 110a and 110b on the vehicles, the parameters determined using the LiDAR system has to be calibrated with the parameters determined using the radar. Coordinates determined for the object 104 in the frame of reference of the LiDAR transducer 110b are different than coordinates determined for the object 104 in the frame of reference of the radar transducer 110a. In order to calibrate these coordinates and their related measurements, it is useful to find a relative pose matrix that transforms between a frame of reference centered on the radar transducers 110a and a frame of reference centered on the LiDAR transducer 110b. Such a relative pose matrix includes a relative rotation matrix and relative translation matrix. Once determined, the relative pose matrix can be used to calibrate measurements from the radar transducer 110a and the LiDAR transducer 110b on an object (such as object 104) to provide measurements that can be used to track the object 104.

Figures 2, 2A:
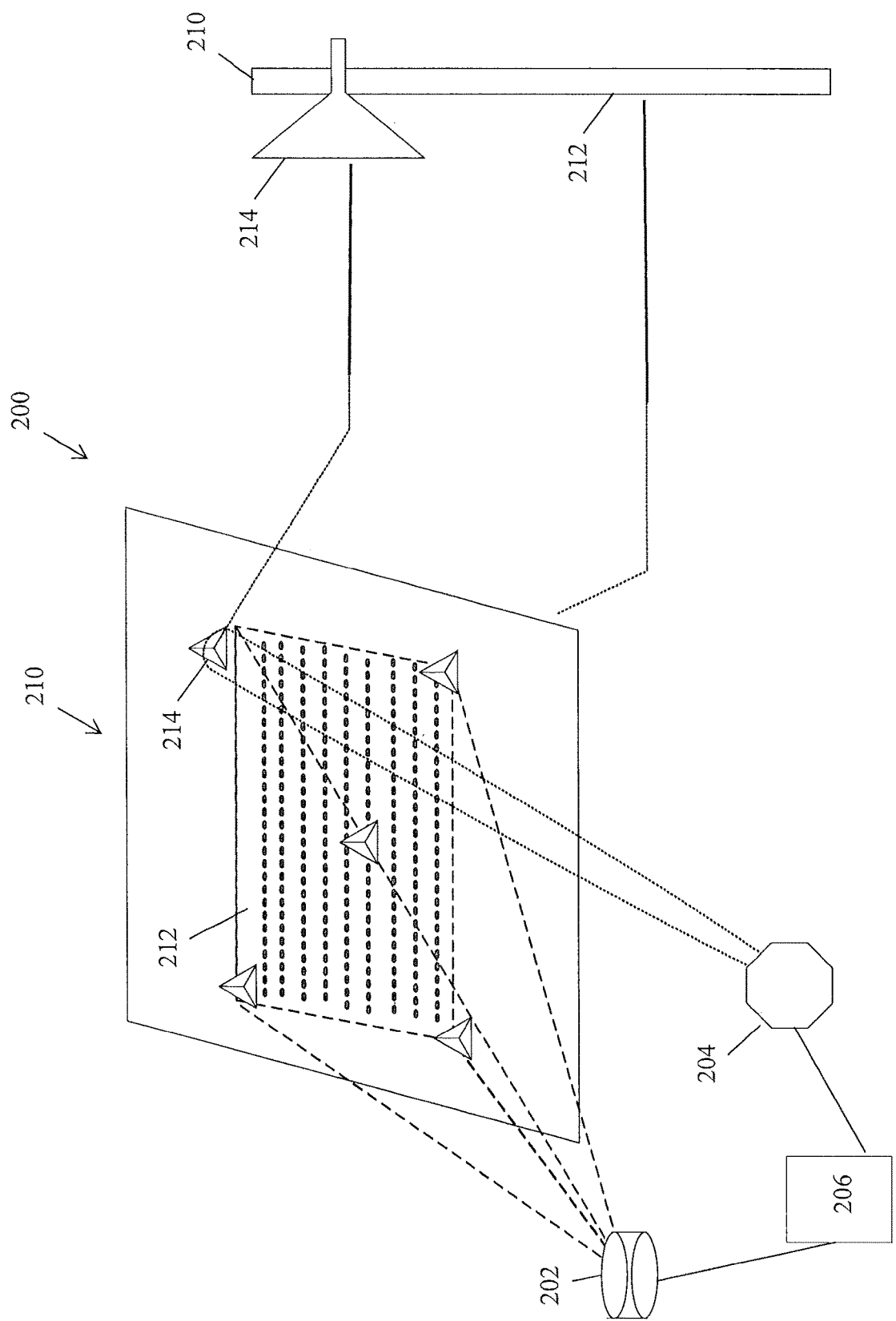
FIG. 2 shows a calibration system for calibrating a LIDAR system at a first location with a radar system at a second location according to an embodiment.
FIG. 2A shows a side view of a calibration target of FIG. 2.

FIG. 2 shows a calibration system 200 for a calibrating a LIDAR system 202 at a first location with a radar system 204 at a second location according to an embodiment. In an embodiment, the LiDAR system 202 is representative of the LiDAR transducer 110b of FIG. 1 and the radar system 204 is representative of the radar transducer 110a of FIG. 1. The LIDAR system 202 and the radar system 204 are at different locations and have different orientations, which lead to differences between measurements of the object 104 obtained at each system. The LiDAR system 202 and the radar system 204 are both in communication with a processor 206 that performs the methods disclosed herein for calibrating the LiDAR system 202 with the radar system 204. The processor 206 can be the same as processor 114 of FIG. 1 and can therefore be used once calibration has been achieved in order to calibrate subsequent LiDAR and radar measurements for the vehicle 100 so that the vehicle can track objects (e.g., object 104) and provide calibrated data to the collision-avoidance system 112 that allows the vehicle 100 to avoid collision or impact with object 104.

The calibration system 220 includes a calibration target 210. The calibration target 210 includes a planar reflective area 212 that is highly reflective of LiDAR signals. A plurality of corner reflectors 214 are attached to the calibration reflector 210 at selected locations of the planar reflective area 210. The corner reflectors 214 are highly reflective of radar signals. FIG. 2A shows a side view of the calibration target 210 of FIG. 2. As shown in FIG. 2A, the calibration target 210 is manufactured so that the corners of the corner reflectors 214 lie within a plane defined by the planar reflective area 212. Thus, the plane defined by the corners of the corner reflectors 214 (and measured by the radar system 204) is substantially the same as the plane defined by the planar reflective area 210 (and measured by the LiDAR system 202). The radar system 204 obtains the coordinates of points defined by each corner reflector 214. Since three points are needed to define a plane, the calibration target 210 includes at least three corner reflectors 214.

In order to calibrate the LiDAR system 202 and the radar system 204, the calibration target 210 is placed at a selected position/location and orientation within the viewing ranges of both the LiDAR system 202 and the radar system 204. In various embodiments, multiple locations and orientations of the calibration target 210 are used for the calibration methods disclosed herein.

The LiDAR system 202 and the radar system 204 both determine coordinates of the plane of the calibration target 210 within their respective frames of reference. The LiDAR system 202 determines a plane for the calibration target 210 from reflections from the reflective area 212 while the radar system 204 determines a plane for the calibration target 210 from reflections from the corner reflectors 214. Since the frame of reference centered on the LiDAR system 202 differs from the frame of reference centered on the radar system 204, the coordinates of the plane of the calibration target 210 in the frame of reference of the LiDAR system 202 are different than the coordinates of the plane of the calibration target 210 in the frame of reference of the radar system 204. The method disclosed herein determines a relative pose matrix that transforms the coordinates of the plane of the calibration target 210 in the reference frame of the radar system 204 to coordinates that represent the plane of the calibration target 210 in the reference frame of the LiDAR system 202.

A method for determining the relative pose matrix is now discussed. The calibration target 210 is placed within a field of view of the LiDAR system 202 and the radar system 204. The calibration target 210 is detected using the LiDAR system 202. The LiDAR measurements are used to determine coordinates that represent points of a plane of the calibration target 210 in the frame of reference of the LiDAR system 202. The subscript L indicates the LiDAR frame of reference. The equation of the plane in the frame of the LiDAR system 204 is given by a plane equation aX+bY+cZ−d=0, which can be rewritten as in Eq. (1):

$$AX_L^i = 0 \qquad \text{Eq. (1)}$$

where $$A=(a,b,c,-d) \qquad \text{Eq. (2)}$$

is a parameter vector that includes coefficients a, b, c and −d of the plane equation, and $$X_L^i = (X, Y, Z, 1)^T \qquad \text{Eq. (3)}$$

includes coordinate X, Y and Z of a point of the planar reflective area 212, which is determined from the LiDAR measurements. The coefficients of the parameter vector A can be determined by solving Eq. (1) for LiDAR measurements obtained from a plurality of points in the planar reflective area 212. In one embodiment, a least squares method using the plurality of LiDAR measurements can solve the parameter vector A.

A plurality of radar measurements are obtained from the corner reflectors 214 using the radar system 204. Coordinates $X_R^j$ of the corner reflectors 214 represent the plane of the calibration target 210 in the frame of reference of the radar system 204. The subscript R indicates the radar frame of reference. A transformation can be made between the coordinates $X_R^j$ in the frame of reference of the radar system 204 to coordinates $X_L^i$ in the reference frame of the LiDAR system by multiplying by a relative pose matrix P, as shown in Eq. (4):

$$X_L^i = P X_R^j \qquad \text{Eq. (4)}$$

The relative pose matrix P includes a rotation matrix R and a translation vector T, as shown in Eq. (5):

$$P = \begin{pmatrix} R & T \\ 0 & 1 \end{pmatrix} = \begin{pmatrix} p_{11} & p_{12} & p_{13} & p_{14} \\ p_{21} & p_{22} & p_{23} & p_{24} \\ p_{31} & p_{32} & p_{33} & p_{34} \\ 0 & 0 & 0 & 1 \end{pmatrix} \qquad \text{Eq. (5)}$$

in which $$R = \begin{pmatrix} p_{11} & p_{12} & p_{13} \\ p_{21} & p_{22} & p_{23} \\ p_{31} & p_{32} & p_{33} \end{pmatrix} \qquad \text{Eq. (6)}$$

and $$T = (p_{14} \quad p_{24} \quad p_{34})^T \qquad \text{Eq. (7)}$$

Once the relative pose matrix and its entries have been determined, the coordinates $X_R^j$ of the radar system 204 can be transformed into the coordinates $X_L^i$ of the LiDAR system 202 and the resulting transformed coordinates can be used in Eq. (1) so that the equality of Eq. (1) is maintained. This can be restated as Eq. (8):

$$A(PX_R^j) = 0 \qquad \text{Eq. (8)}$$

Eq. (8) can be rewritten as $$Fp = 0 \qquad \text{Eq. (9)}$$

in which $$p = (p_{11} p_{12} p_{13} p_{14} p_{21} p_{22} p_{23} p_{24} p_{31} p_{32} p_{33} p_{34})^T \qquad \text{Eq. (10)}$$

The left hand side of Eq. (8) can be used in a cost function and the cost function can be reduced or minimized in order to determine the relative pose matrix P. The rotation matrix of the relative pose matrix is an orthogonal matrix. In order to determine the orthogonal rotation matrix, a singular value decomposition of the rotation matrix can be performed, as shown in Eq. (11):

$$R = USV^T \qquad \text{Eq. (11)}.$$

For a matrix that is written in the form of a singular value decomposition, a scalar value α can be determined by Eq. (12):

$$\alpha = det(UV^T) \qquad \text{Eq. (12)}$$

such that the rotation matrix R can be written as $$R = U \begin{pmatrix} 1 & 0 & 0 \\ 0 & 1 & 0 \\ 0 & 0 & \alpha \end{pmatrix} V^T \quad \text{Eq. (13)}$$

and the translation matrix T that corresponds to the rotation matrix R can be written as $$T = \alpha P(1:3,4)/s_{11} \quad \text{Eq. (14)}$$

wherein $P(1:3,4)$ refers to $(p_{14}, p_{24}, p_{34})$ and $s_{11}$ is the singular value of the first row and first column of matrix S.

A cost function $C(R,T)$ can be formed from the left hand side of Eq. (8) and the cost function can be minimized in order to determine the relative position matrix P. In other words, cost function $$C(R,T) = \|A(PX_R^i)\|^2 \quad \text{Eq. (15)}$$

is minimized in order to determine P. In one embodiment, a least squares method is used to reduce the cost function. In another embodiment, the calibration target 210 can be placed at multiple locations, thereby obtaining a plurality of cost functions of Eq. (15), one for each of the plurality of orientations and positions of the calibration target 210. A summed cost function can be composed that is a summation of the plurality of cost functions. The same relative pose matrix transforms the coordinates for any position and/or orientation of the calibration target. Therefore, the summed cost function (for the calibration target at the plurality of positions and orientations) is given in Eq. (16) as:

$$C(R,T) = \sum_{\substack{\text{all orientations and} \\ \text{positions of target}}} \left\| A_j \left( \begin{pmatrix} R & T \\ 0 & 1 \end{pmatrix} X_R^i \right) \right\|^2 \quad \text{Eq. (16)}$$

The summed cost function of Eq. (16) can be minimized or reduced in order to determine the relative pose matrix P.

Determining the relative pose matrix P effectively calibrates the LiDAR system 202 with the radar system 204. For LiDAR and radar systems on a vehicle, upon determining the relative pose matrix P using the methods disclosed herein, the relative pose matrix P can be used along LiDAR and radar measurements of objects within observational range of the vehicle 100 upon which the LiDAR system 202 and radar system 204 are disposed. The relative pose matrix P can be used to transform measurements of the object 104 made using the radar system 204 into a frame of reference of the LiDAR system 202, thereby calibrating the radar measurements of the object with the LiDAR measurements of the object 104.

FIG. 3 shows a flowchart 300 illustrating a method for determining a relative pose matrix between a LiDAR system and a radar system as disclosed herein. The LiDAR system and the radar system are disposed on a vehicle. In Box 302, range coordinates for the calibration target 210 are obtained in a frame of reference of a LiDAR system at a first location on the vehicle. In Box 304, the range coordinates are used to determine coefficients of a plane of the calibration target in the LiDAR frame of reference. In Box 306, range coordinates are obtained for the calibration target in a frame of reference of a radar system at a second location on the vehicle. In Box 308, a cost function is created from a planar equation that includes the determined coefficients, the range coordinates in the frame of reference of the radar system and a relative pose matrix that transforms from the frame of reference of the radar system to the frame of reference of the LiDAR system. In Box 310, the cost function is reduced or minimized in order to determine the parameters of the relative pose matrix. In Box 312, an object is detected with respect to the vehicle using the LiDAR system, the radar system and the determined relative pose matrix.

FIG. 4 shows a flowchart 400 that illustrates another method for determining the relative pose matrix using a plurality of positions and orientations of the calibration target 210. In box 402, for a plurality of positions and orientations of the calibration target, LiDAR coordinates are obtained for the calibration target using a LiDAR system at a first location and radar coordinates are obtained for the calibration target using a radar system at a second location. In box 404, a planar equation is determined for each position and orientation of the calibration target. Each planar equation includes coefficients of the planar equation determined using LiDAR measurements for the selection position and orientation, coordinates of the calibration target obtained using the radar system for the selection position and orientation and a relative pose matrix. In box 406, a cost function is created that is a sum of the planar equations for each of the plurality of positions and orientations of the calibration target 210. In box 408, the cost function is reduced or minimized to determine the parameters of the relative pose matrix. In box 410, an object is detected with respect to the vehicle using the LiDAR system, the radar system and the determined relative pose matrix.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of calibrating a LiDAR system at a first location with a radar system at a second location, comprising:
   providing a calibration target at a location and orientation with respect to the LiDAR system and the radar system;
   determining coefficients of a plane of the calibration target in a frame of reference of the LiDAR system;
   determining coordinates of the calibration target in a frame of reference of the radar system;
   composing a cost function from a planar equation that includes the determined coefficients of the plane of the calibration target in the frame of reference frame of the LiDAR system, the determined coordinates of the calibration target in the frame of reference of the radar system and a relative pose matrix that transforms the frame of reference of the radar system to the frame of reference of the LiDAR system; and
   reducing the cost function to estimate the relative pose matrix for calibration of the LiDAR system with the radar system.

2. The method of claim 1, wherein the calibration target includes a planar reflective area and a plurality of corner reflectors.

3. The method of claim 2, wherein the plurality of corner reflectors further comprises three or more corner reflectors.

4. The method of claim 2, further comprising receiving a LiDAR reflection signal from the planar reflective area of the calibration target and determining the coefficients of the plane of the calibration target in the frame of reference of the LiDAR system from the LiDAR reflection signal.

5. The method of claim 4, further comprising receiving a radar reflection signal from the plurality of corner reflectors and determining the coordinates of the calibration target in the frame of reference of the radar system from the radar reflection signals.

6. The method of claim 1, further comprising
providing the calibration target at a plurality of locations and orientations;
determining the coefficients of the plane of the calibration target in the frame of reference of the LiDAR system for each of the plurality of locations and orientations;
determining coordinates of the plane of the calibration target in the frame of reference of the radar system for each of the plurality of locations and orientations;
composing a summed cost function to include a summation of cost functions for each of the plurality of locations and rotations, wherein each cost function includes the determined coefficients, the determined coordinates and the relative pose matrix for the related location and orientation of the target reflector; and
reducing the summed cost function to estimate the parameters of the relative pose matrix.

7. The method of claim 1, wherein the relative pose matrix includes a rotation matrix and a translation matrix.

8. The method of claim 1, wherein the LiDAR system and the radar system are disposed on a vehicle, further comprising using the LiDAR system, radar system and estimated relative pose matrix to track an object with respect to the vehicle.

9. The method of claim 8, further comprising maneuvering the vehicle based on parameters of the tracked object obtained using the LiDAR system, radar system and estimated relative pose matrix.

10. An apparatus for calibrating a LiDAR system at a first location with a radar system at a second location, comprising:
a calibration target at a location and orientation with respect to the LiDAR system and the radar system;
a processor configured to:
determine coefficients of the calibration target in a frame of reference of the LiDAR system,
determine coordinates of the calibration target in a frame of reference of the radar system,
compose a cost function from a planar equation that includes the determined coefficients of the calibration target in the frame of reference frame of the LiDAR coordinate system, the determined coordinates of the calibration target in the frame of reference of the radar system and a relative pose matrix that transforms the frame of reference of the radar system to the frame of reference of the LiDAR system, and
reduce the cost function to estimate the relative pose matrix for calibration of the LiDAR system with the radar system.

11. The apparatus of claim 10, wherein the calibration target includes a planar reflective area and a plurality of corner reflectors.

12. The apparatus of claim 11, wherein the plurality of corner reflectors further comprises three or more corner reflectors.

13. The apparatus of claim 11, wherein the processor determines the coefficients of the plane of the calibration target in the frame of reference of the LiDAR system from a LiDAR reflection signal received from the planar reflective area of the calibration target.

14. The apparatus of claim 13, wherein the processor determines the coordinates of the plane of the calibration target in the frame of reference of the radar system from radar reflection signals received from the corner reflectors.

15. The apparatus of claim 10, wherein the calibration target is placed at a plurality of locations and rotational angles and the processor is further configured to:
determine the coefficients of the plane of the calibration target in the frame of reference of the LiDAR system for each of the plurality of locations and orientations;
determine coordinates of the plane of the calibration target in the frame of reference of the radar system for each of the plurality of locations and orientations;
compose a summed cost function to include a summation of cost functions for each of the plurality of locations and orientations, wherein each cost function includes the determined coefficients, the determined coordinates and the relative pose matrix for the related location and orientation of the target reflector; and
reduce the summed cost function to estimate the parameters of the relative pose matrix.

16. The apparatus of claim 10, wherein the relative pose matrix includes a rotation matrix and a translation matrix.

17. The apparatus of claim 10, wherein the LiDAR system and the radar system are disposed on a vehicle, wherein the processor is further configured to track an object with respect to the vehicle using the LiDAR system, radar system and estimated relative pose matrix.

18. The apparatus of claim 17, wherein the processor is further configured to maneuver the vehicle based on parameters of the tracked object obtained using the LiDAR system, radar system and estimated relative pose matrix.

* * * * *